US012467018B2

(12) United States Patent
Bai et al.

(10) Patent No.: US 12,467,018 B2
(45) Date of Patent: *Nov. 11, 2025

(54) CLEANING AND POLISHING FLUID AND METHOD OF USING

(71) Applicant: 3M INNOVATIVE PROPERTIES COMPANY, St. Paul, MN (US)

(72) Inventors: Feng Bai, Woodbury, MN (US); Sarah L. Hagen, Inver Grove Heights, MN (US); Matthew P. Guay, Minneapolis, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 761 days.

This patent is subject to a terminal disclaimer.

(21) Appl. No.: 17/624,632

(22) PCT Filed: Jul. 8, 2020

(86) PCT No.: PCT/IB2020/056428

§ 371 (c)(1),
(2) Date: Jan. 4, 2022

(87) PCT Pub. No.: WO2021/005533

PCT Pub. Date: Jan. 14, 2021

(65) Prior Publication Data

US 2022/0275309 A1 Sep. 1, 2022

Related U.S. Application Data

(60) Provisional application No. 62/871,583, filed on Jul. 8, 2019.

(51) Int. Cl.
*C11D 3/08* (2006.01)
*B08B 3/04* (2006.01)
(Continued)

(52) U.S. Cl.
CPC .......... *C11D 3/3765* (2013.01); *C11D 3/1246* (2013.01); *C11D 2111/14* (2024.01); *C11D 2111/44* (2024.01)

(58) Field of Classification Search
CPC ......... C11D 3/08; C11D 3/124; C11D 3/1246; C11D 3/162; C11D 3/37; C11D 3/3765;
(Continued)

(56) References Cited

U.S. PATENT DOCUMENTS 5,178,668 A * 1/1993 Traver ................ C04B 41/4972 428/452
5,770,548 A * 6/1998 Leskowicz ........... C11D 3/1246 510/435
(Continued)

FOREIGN PATENT DOCUMENTS

JP 2005023149 A 1/2005
JP 2006008801 A 1/2006
(Continued)

OTHER PUBLICATIONS

International Search Report for PCT International Application No. PCT/IB2020/056428 mailed on Oct. 14, 2020, 3 pages.

*Primary Examiner* — Brian P Mruk
(74) *Attorney, Agent, or Firm* — Jeffrey M. Olofson

(57) ABSTRACT

Cleaning and polishing fluids are described. In particular, cleaning and polishing fluids that include water, polymer, and a silicate are described. These cleaning and polishing fluids exhibit good performance, particularly when used with an abrasive pad in a cleaning process.

20 Claims, 2 Drawing Sheets

(51) Int. Cl.
*C11D 3/12* (2006.01)
*C11D 3/37* (2006.01)

(58) Field of Classification Search
CPC .... C11D 11/0023; C11D 11/0064; B08B 3/04
See application file for complete search history.

(56) References Cited

U.S. PATENT DOCUMENTS

| | | | | |
|---|---|---|---|---|
| 6,010,995 | A | 1/2000 | Van Eenam | |
| 6,080,389 | A | 6/2000 | Sheariss | |
| 6,387,977 | B1 | 5/2002 | Sawhney | |
| 7,025,954 | B2 | 4/2006 | Johnston | |
| 8,299,151 | B1 * | 10/2012 | Hills | B24B 1/00 524/145 |
| 8,501,834 | B2 | 8/2013 | Maletz | |
| 2002/0147258 | A1 | 10/2002 | Yarmey et al. | |
| 2004/0159073 | A1 | 8/2004 | Palermo et al. | |
| 2017/0002299 | A1 | 1/2017 | Holtz | |
| 2017/0120411 | A1 * | 5/2017 | Thysell | B24B 7/186 |
| 2017/0216152 | A1 | 8/2017 | Hecht | |
| 2017/0306266 | A1 | 10/2017 | Ryther | |
| 2017/0362434 | A1 | 12/2017 | Ye | |
| 2018/0001430 | A1 | 1/2018 | Hills | |
| 2019/0000721 | A1 | 1/2019 | Ludsteck | |

FOREIGN PATENT DOCUMENTS

| | | | |
|---|---|---|---|
| JP | 2019104792 | A | 6/2019 |
| WO | 02070618 | A2 | 9/2002 |
| WO | WO 2008-014466 | | 1/2008 |
| WO | WO 2010-053729 | | 5/2010 |
| WO | 2013039688 | A1 | 3/2013 |
| WO | 2016148917 | A1 | 9/2016 |

* cited by examiner

CLEANING AND POLISHING FLUID AND METHOD OF USING

BACKGROUND

Cleaning fluids, sometimes referred to as cleaners, are commonly used as part of a regular floor maintenance regiment. Cleaning removes soil but does not significantly increase the gloss of a surface. Polishing is typically done with a separate, high speed burnishing process. The process of burnishing is often loud, messy, and time consuming, and is therefore not typically performed when a facility is open.

SUMMARY

In one aspect, the present description relates to a cleaning and polishing fluid. In particular, the cleaning and polishing fluid includes water, a polymer, and a silicate, where the water is greater than 98 wt % of the fluid.

In another aspect, the present description relates to a method of cleaning and increasing a gloss of a hard floor surface. In particular, the method includes dispensing onto the hard floor surface an aqueous solution including greater than 98 wt % water, a polymer, and a silicate; contacting the hard floor surface with a moving abrasive pad in the presence of the aqueous solution; and drying the hard floor surface.

In yet another aspect, the present description relates to a method of cleaning and increasing a gloss of a hard floor surface. In particular, the method includes contacting a hard floor surface with an abrasive pad in the presence of an aqueous solution including greater than 98 wt % water, a polymer, and a silicate.

In another aspect, the present description relates to a method of preparing a floor cleaning and polishing fluid. In particular, the method includes providing a concentrate including water, a polymer and a silicate; and diluting the concentrate in water such that the water is greater than 98 wt % of the fluid.

In yet another aspect, the present description relates to a method of maintaining a hard floor surface. In particular, the method includes cleaning and polishing the hard floor surface at a same first time to increase an initial first gloss to a resulting first gloss, and, after an interval, cleaning and polishing the hard floor surface at a same second time to increase an initial second gloss to a resulting second gloss. The steps of cleaning and polishing the hard floor surface at the same first and second times include dispensing onto the hard floor surface an aqueous solution including greater than 98 wt % water, a polymer, and a silicate; contacting the hard floor surface with a moving abrasive pad in the presence of the aqueous solution, and optionally repeating the steps of dispensing, contacting, and drying through multiple passes. At the first time, at the second time, and during the interval, the hard floor surface is not subjected to burnishing.

DETAILED DESCRIPTION

Figure 1:
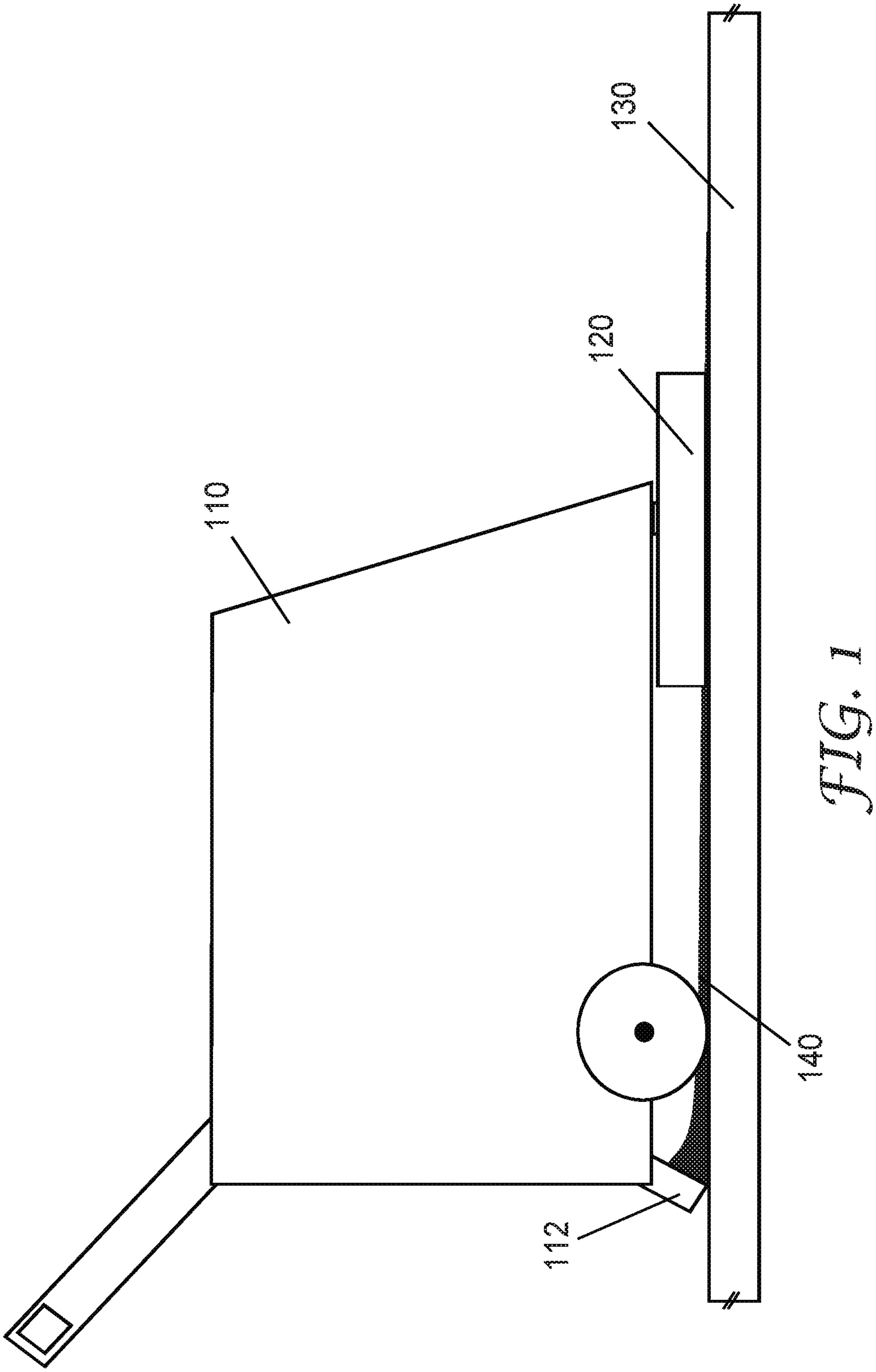
FIG. 1 is a schematic of a floor cleaning machine being used to contact a moving abrasive pad with a hard floor surface in the presence of a cleaning and polishing fluid.

Conventionally, cleaning a hard floor surface and increasing the gloss (polishing) a hard floor surface are considered to be and treated as separate steps, requiring separate equipment and blocks of time.

Cleaning fluids are typically neutral or near-neutral pH as to not damage or degrade the floor finish. An automatic floor scrubber (or auto scrubber) is commonly used with cleaning fluids. Auto scrubbers include a rotating hub for a nonwoven pad, a tank and dispenser for cleaning fluid or water, a squeegee and vacuum to collect and remove used fluid, and a tank for holding collected used fluid. During the time the liquid is in contact with the floor, the nonwoven pad—rotating at low speeds (approximately 100 to 250 rpm)—contacts the hard floor surface in order to remove soil. Swing (rotary) scrubbers may also be used to clean floors.

Auto scrubbers are either self-propelled, ridden on, or pushed at typical walking speeds. Therefore, the contact time for any dispensed fluid with a hard floor surface before it is suctioned back into the machine is quite short. In some cases, the contact time is less than ten seconds, less than five seconds, less than three seconds, or even less than two seconds.

At least partially due to this abbreviated contact time, it is conventionally thought that cleaning fluids, or the process of daily or routine maintenance using such cleaning fluids, are an incomplete solution. While cleaning with an auto scrubber and a conventional cleaning fluid may help remove floor soil, such a process was not thought to contribute to a significant increase in gloss.

Burnishing is used to restore or increase dulled gloss on a hard floor surface. Burnishing uses a high speed rotating nonwoven pad, typically in the absence of liquid (i.e., an effective amount of liquid or water: some residual or trivial moisture may be present). Providing the high rotational speeds for the pad requires a more powerful motor, which creates more noise. Additionally, many versions of burnishers require propane combustion, giving off unpleasant exhaust fumes and an incremental carbon footprint.

Typical regiments with cleaning fluids, even with cleaning fluids marketed as restorers, prescribe a burnishing step to achieve the high gloss final polish of the floor surface. For at least some of the reasons described herein, facilities and facilities management professionals prefer to burnish as infrequently as possible, if at all. But, the perception of a shiny floor as a clean floor persists.

The cleaning and polishing fluid described herein surprisingly provides excellent cleaning performance while also enhancing the appearance of a floor finish, without any burnishing step. In particular, even with the short floor contact time typical of being used in an auto scrubber tank and process, the cleaning and polishing fluid described herein improves the shine of a coated hard floor surface. Also surprisingly, such cleaning and polishing fluids are effective at economical dilutions at greater than 98 or even 99 wt % water. For example, cleaning and polishing fluids explored herein were effective at dilutions of 1 ounce of concentrated formula (approximately 29.6 mL) per six gallons of water (approximately 22,712 mL).

Cleaning and polishing fluids described herein are primarily water. The fluids may be greater than 95 wt % water, greater than 97 wt % water, greater than 98 wt % water, greater than 99 wt % water, or even greater than 99.9 wt % water. In addition to water, these fluids include a polymer and a silicate. Optionally, these fluids may include a surfactant (including an anionic surfactant, a nonionic surfactant, a cationic surfactant, a zwitterionic surfactant, or combinations of these). Optionally, these fluids may include a siliconate. Optionally, these fluids may include a wetting agent. Optionally, these fluids may include a solvent. Other additives may be provided as desired, such as colorants, fragrances, or the like.

The polymer can assume a wide variety of forms and can include one or more polymers (including, but not limited to polymers, copolymers, and terpolymers). In some embodiments, the polymer may be emulsion-based. In some embodiments, the polymer may be a self-crosslinking polymer. In some embodiments the polymer may be an acrylic polymer, acrylic copolymer, styrene-acrylic copolymers, or blends thereof. Acrylic polymers contain only one type of acrylate monomer, whereas the acrylic copolymers include two or more different types of acrylate monomers. Styrene-acrylic copolymers include at least one type of styrene monomer and one type of acrylate monomer. The acrylate monomers can include acrylic acid, butyl acrylate, ethyl acrylate, methyl acrylate, 2-ethyl hexyl acrylate, acrylonitrile, acrylamide, methacrylic acid, methyl methacrylate, ethyl methacrylate, butyl methacrylate, methacrylamide, and the like. Style monomers can include styrene, alpha-methyl styrene, and the like. Commercially available acrylic copolymers include methyl methacrylate/butyl acrylate/methacrylic acid (MMA/BA/MAA) copolymers, methyl methacrylate/butyl acrylate/acrylic acid (MMA/BA/AA) copolymers, and the like.

Commercially available acrylic polymers include, for example, Morglo II Latex from Omnova Solutions, Inc., of Chester S.C. Other commercially available acrylic copolymers include: Rhoplex B-924, Roshield 3188, and Duraplus 3 from Dow Chemical of Midland, MI, Megatran 220 and Megatran 240 from Interpolymer Corporation of Canton, MA, MAC 34 and AC 2728 from Alberdingk Boley, Inc. of Greensboro, N.C.

Commercially available acrylic urethane hybrid copolymers include the Hybridur family of products such as Hybridur 870 and 878 from Air Products, Inc., APU 10140, APU 10600, and APU 10620 from Alberdingk Boley, Inc., and NeoPac R-9036 and E-129 from DSM NeoResins, Inc. of Wilmington, MA.

Commercially available urethane polymers include the U series of solvent free polyurethane dispersions such as U 6150 and U 9380 from Alberdingk Boley, Inc., Bayhydrol UH 2558 and UH 2606 from Bayer Materials Science, NeoRez R-2180, NeoRez R-2005, NeoRez R-9029 and NeoRez R-2190 from DSM NeoResins, Inc., and the Sancure and Turboset polyurethane dispersions available from Lubrizol Corporation of Cleveland, OH.

In some embodiments, the polymer composition incorporates acrylic chemistry based components in combination with polyurethanes (poly(urethane-acrylate) hybrids). Polyurethanes and polyacrylates can be used together to achieve coatings that are both hard and tough. In another embodiment, the film-forming polymer matrix includes a hybrid copolymer consisting of urethane and acrylic polymer chains. In an embodiment, the acrylic urethane hybrid polymer can be added to commercially available acrylic-based compositions. In some embodiments, epoxides can also be used as part of the polymer composition. In various embodiments, polyacrylate-epoxides can be used. Any of the polymers or polymer compositions described above may be present in any suitable amount.

In some embodiments, the silicate may be an alkali metal silicate. Alkali metal silicates are generally denoted as $M_2O{:}SiO_2$, where M is lithium, sodium, or potassium. The weight ratio of $SiO_2$ to $M_2O$ may range from about 1.4:1 to about 3.75:1. In some embodiments, the silicate may be a lithium silicate. In some embodiments, the silicate may be a sodium silicate. In some embodiments, the silicate may be a potassium silicate. In some embodiments, the silicate may include combinations or blends of alkali metals. The silicate may be present in any suitable amount.

In some embodiments, the fluids include a siliconate, present in any suitable amount. The siliconates may be alkali metal siliconates, including alkali metal salts formed with sodium, potassium, or lithium, and blends and combinations thereof. Generally, if included, these cleaning and polishing fluids include less siliconate (by weight-percent) than silicate. In some embodiments, these fluids include a wetting agent.

Cleaning and polishing fluids described herein may have a high (basic) pH, even after dilution in water, due to the presence of the silicate and the optional siliconate. In some embodiments, the pH of the fluid is greater than 9. In some embodiments, the pH is greater than 9.5. In some embodiments, the pH is greater than 10. The pH can be adjusted or modified using any suitable acid, base, or buffering agent.

Cleaning and polishing fluids described herein provide benefits when a pad having only coarse abrasives contacts the hard floor surface in the presence of the fluid. Examples include the 3M™ Red Buffer Pad 5100 available from 3M Company (St. Paul Minn.). Additionally, interestingly, there is an enhanced benefit to both cleaning and polishing when used with a pad having fine abrasive particles. For the purposes of this description, fine abrasive particle are particles with a size between 0.1 micrometers and 30 micrometers. In some embodiments, the fine abrasive particles may include diamonds. In some embodiments, the fine abrasive particles may include silicon carbide. In some embodiments, the fine abrasive particles may include aluminum oxide. Suitable pads include the Scotch-Brite™ Clean & Shine Pad and the Scotch-Brite™ Purple Diamond Floor Pad Plus, both available from 3M Company (St. Paul, Minn.).

FIG. 1 is a schematic of a floor cleaning machine being used to contact a moving abrasive pad with a hard floor surface in the presence of an cleaning and polishing fluid. Auto scrubber 110 as shown is a walk-behind model but any suitable auto scrubber (including ride-on or self-propelled), or even a swing scrubber or other floor scrubbing apparatus or machine may be used.

Abrasive pad 120 is attached to auto scrubber 110 via an attachment mechanism (not specifically illustrated), which may be, as an example, a central hub or attachment prongs. Abrasive pad is moved—in some cases rotated or, depending on the mechanism of the scrubbing machine, agitated or moved in an orbital or random orbital motion—and placed in contact with hard floor surface 130.

Hard floor surface 130 may be any suitable surface—including vinyl composition tile (VCT), solid vinyl tile, a stone floor, or any other suitable natural or manufactured floor surface recommended for auto scrubber use. In some embodiments, the hard floor surface has been coated with a floor finish or protective coating. In FIG. 1, hard floor surface is indicated with break lines to show it can be of arbitrarily large or small dimensions.

The abrasive pad 120 is contacted to the hard floor surface 130 in the presence of aqueous solution 140, which, in FIG. 1, is dispensed from within a tank within auto scrubber 110 (but may be dispensed or applied other ways, including from a separate machine or even by hand or mop). As the auto scrubber moves across the hard floor surface 130 (to the right from the perspective of FIG. 1), the squeegee 112 attached to auto scrubber 110 ensures that substantially all of the used aqueous solution (which may include floor soil) is suctioned up into a used fluid holding tank within the auto scrubber.

Cleaning and polishing fluids described herein may be provided as either a ready-to-use fluid or in a concentrate. The concentrate may include between 40 and 60% water by weight. Diluted preparations may be prepared using the concentrate and any suitable water source.

Because the methods and formulas described herein can produce a cleaner and glossier floor used with an auto scrubber or any other (non-burnishing) process, the cleaning and polishing steps may be repeated after a certain interval to increase the gloss without burnishing. In some embodiments the interval is at least 24 hours (i.e., a daily maintenance program). In some embodiments, the interval is at least 12 hours.

In conjunction with the described methods and formulas, burnishing may be used infrequently or even not at all. Burnishing may be done only every month, or only ever three months, or only every six or twelve months.

EXAMPLES

Materials Used in the Examples

| | |
|---|---|
| Ethyl carbitol solvent | Available from Dow Chemical, Midland, MI |
| Acrylic emulsion | Available from Essential Polymer Inc., Merton, WI (R5191, 41% solid) |
| EASY-WET 20 wetting agent | Available from Ashland Chemical, Columbus, OH |
| ECOSURF EH-6 surfactant | Available from Dow Chemical, Midland, MI |
| TOMADOL 900 surfactant | Available from Evonik Corporation, Allentown, PA |
| Lithium silicate | Available from W.R. Grace & Co.-Conn., 20%, Columbia, MD |
| Sodium silicate | Available from PQ Corp. Malvern, PA (37.0 wt % with 2.75 wt % ratio of SiO2/Na2O) |
| XIAMETER OFS-0777 siliconate | Available from Dow Corning Co., Midland, MI |
| 3M Red Buffer Pad 5100 | Available from 3M Company, St Paul, MN |
| SCOTCH-BRITE Clean & Shine Pad | Available from 3M Company, St Paul, MN |
| SCOTCH-BRITE Surface Preparation Pad | Available from 3M Company, St Paul, MN |
| SCOTCHGARD UHS 25 Floor Finish | Available from 3M Company, St Paul, MN |
| SCOTCHGARD Low Maintenance 18 Floor Finish | Available from 3M Company, St Paul, MN |
| HIGH MILEAGE Floor Finish | Available from Diversey, Fort Mill, SC |
| 3M ™ Neutral Cleaner Concentrated 3H | Available from 3M Company, St Paul, MN |
| UHS SC Floor Cleaner | Available from Diversey, Fort Mill, SC |
| No/Low Maintenance Floor Cleaner and Protector | Available from Ecolab, St Paul, MN |
| REVIVE Plus SC Maintainer/Rejuvenator | Available from Diversey, Fort Mill, SC |
| Premium EXCELLON VCT tiles | Available from Armstrong, Lancaster, PA |
| Carpet soil | Available from Textile Innovators, Rockhill, SC. |
| SCOTCHGARD Floor protector applicator pad | Available from 3M Company, St Paul, MN |

Equipment Used for Testing in the Examples

Auto scrubbers: single head T3, 20 inch, and Dual Head, T300.12 inch (both available from Tennant Company, Minneapolis, MN).

BKY Gardner Spectro-Guide Sphere (6834) Color Spectrophotometer (available from BYK USA, Wallingford, CT)

Gloss-Haze-DOI/RIQ Meter (available from RHOPOINT Instruments, West Sussex, UK).

Preparation of Examples

TABLE 1

Composition of examples.

| Materials | Example-1 | Example -2 |
|---|---|---|
| Water (g) | 58.44 | 58.44 |
| Ethyl carbitol (g) | 1.62 | 1.62 |
| Lithium silicate (20 wt. %, g) | 9.74 | 9.74 |
| Potassium siliconate (20 wt. %, g) | 0 | 3.25 |
| Acrylic emulsion (41%, g) | 16.23 | 16.23 |
| TOMADOL 900 surfactant (g) | 6.82 | 6.82 |
| ECOSURF EH-6 surfactant (g) | 2.92 | 2.92 |
| EASY-WET 20 wetting agent (g) | 0.97 | 0.97 |

Preparation of Example-1 and Example-2

To a 200 mL glass beaker containing a magnetic stir bar were added 58.44 g of DI water, 1.62 g of Ethyl Carbitol (commercially available from Dow Chemical, Midland, MI), while stirring, 16.23 g of acrylic emulsion (R5191, 41% solids, available from Essential Polymer Inc., Merton, WI) was added followed by the addition of 0.97 g of Easywet-20 (commercially available from Ashland Chemical, OH). After the mixture was stirred for 30 minutes, 2.92 g of Ecosurf EH-6 (commercially available from Dow Chemical, MI) was then added to the beaker followed by the addition of 6.82 g of Tomadol-900 (commercially available from Evonik Corporation, Allentown, PA). After 30 minutes' stir of this mixture, 9.74 g of lithium silicate was added (commercially available from W.R. Grace & Co.-Conn., 20% solids, Columbia, MD) The beaker was covered with alumina foil and the final mixture was stirred for overnight to be ready for use.

Example-2 was prepared following the same procedures as for Example-1, except that 3.25 g of OFS-0777 silconate (commercially available from Dow Corning Co., Midland, MI) was added along with the lithium silicate.

Preparation of Test Substrate

The vinyl composition tiles (VCTs) were laid on the flat concrete in a size large enough for conducting test (24×40 sf). The VCTs were scrubbed with the Tennant T3 auto scrubber using water and a Scotch-Brite™ Surface Preparation Pad and allowed to dry before coating. Three coats of each finish were applied at 2000 sq ft per gallon using a microfiber pad. Each coat was allowed to dry 45 minutes before application of the next layer. After 2 days cure time, the test area was scrubbed one pass with the Tennant T3 auto scrubber using water and a Scotch-Brite™ Surface Preparation Pad. Once dry, an even layer of carpet soil was sprinkled over the test area and spread evenly using a dry microfiber pad.

Test Procedure

The holding tank of T300 auto scrubber was well cleaned with water, and then one 12-inch 3M Red Buffer Pad 5100 or one 12-inch SCOTCH-BRITE Clean & Shine Pad were loaded (see floor pad column in Table 2). One ounce of Example-1 was uniformly diluted with 6 gallons of water in two of a 5-gallon buckets, and then added to auto scrubber tank. Auto scrubber were run 2 passes on the soiled test section with the following test conditions: medium setting of water flow, low or high pad pressure according to test section and lowest setting of walking speed.

Test was repeated according to the above procedure for each cleaning agent with appropriate dilution ratio (to manufacturer's recommended dilution, if available) (Example-2: 1 ounce to 6 gallons; 3M Neutral Cleaner Concentrated 3H (3H Cleaner): 1 ounce to 3 gallons; UHS SC Cleaner: 1 ounce to 8 gallons; No/Low Maintenance Floor Cleaner and Protector (No/Low Cleaner): 1 ounce to 2 gallons; Revive Plus SC Floor Maintainer/Rejuvenator (Revive Plus Maintainer): 1 ounce to 4 gallons).

Data Collection

BKY Gardner Spectro-Guide Sphere (6834) Color Spectrophotometer was used to collect color values (L, a, and b). Five data points were taken on the given test tile using a template, and the average was used as final measured value. Two sets of color data (L, a, and b) were collected: (1) after application of testing soil, and (2) after the completion of cleaning test. The color difference, Delta E, was calculated using the following formula:

$$\text{Delta } E=\text{SQRT}[(L_2-L_1)^2+(a_2-a_1)^2+(b_2-b_1)^2]$$

Higher Delta E value indicates better cleaning efficiency for the tested cleaning agent.

TABLE 2

Summary of the cleaning test.

| Floor Pad | Cleaner Type | Scotchgard ™ UHS 25 Floor Finish: Delta E (low pad pressure) | Scotchgard ™ UHS 25 Floor Finish: Delta E (high pad pressure) | High Mileage Floor Finish: Delta E (low pad pressure) | High Mileage Floor Finish: Delta E (high pad pressure) |
|---|---|---|---|---|---|
| 3M ™ Red Buffer Pad 5100 | Example-1 | 0.43 | 0.09 | 1.55 | 2.69 |
| | Example-2 | 0.48 | 0.26 | 2 | 2.86 |
| | 3H cleaner | 0.87 | 0.57 | 1.71 | 1.52 |
| | UHS SC cleaner | 0.42 | 0.32 | 1.56 | 2.08 |
| | No/Low cleaner | 0.85 | 0.54 | 2.24 | 2.15 |
| | Revive Plus maintainer | 0.26 | 0.45 | 0.37 | 0.49 |
| Scotch-Brite ™ Clean & Shine Pad | Example-1 | 0.85 | 0.69 | 2 | 3.15 |
| | Example-2 | 1.1 | 1.32 | 2.37 | 3.22 |
| | 3H cleaner | 0.76 | 1.24 | 1.84 | 2.54 |
| | UHS SC cleaner | 0.99 | 0.3 | 2.01 | 2.31 |
| | No/Low cleaner | 1.11 | 1.42 | 2.44 | 2.86 |
| | Revive Plus maintainer | 0.53 | 0.67 | 1.62 | 1.52 |

Test with Example 2 and 3H Neutral Cleaner on Worn Floor Coating

Figure 2:
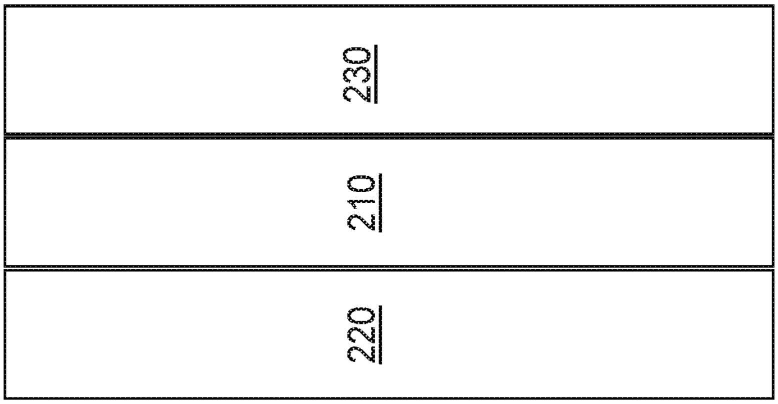
FIG. 2 is a schematic of a first on-floor test configuration.

Test was conducted on highly worn, Scotchgard™ Low Maintenance 18 (LM-18) Floor Finish coated semi white vinyl composition title (VCT). The test was conducted with two of 2 ft×9 ft areas, with this worn floor as shown in FIG. 2. The center area 210 (1 ft×9 ft) was existing section, and the left 220 and right 230 to the center areas were testing sections with different conditions.

Data Collection

In addition to the collection of color data as described earlier, Gloss reading (60 degree) and DOI (Distinctness of Image) were also collected for before and after test for each test section using Gloss-Haze-DOI/RIQ Meter. Once again, five data points were taken for each testing section, and the average was used as final measured value.

Procedure

Test with Example-2. The holding tank of the T3 auto scrubber was well cleaned with water. One ounce of Example-2 was uniformly diluted with 3 gallons of water in a 5-gallon bucket, and then added to the auto scrubber tank. A new Scotch-Brite™ Clean & Shine Pad (C/S Pad) was loaded on the auto scrubber. Auto scrubber was run 10 passes in section 230 with the following test conditions: medium setting of water flow, high pad pressure and lowest setting of walking speed.

Test with 3H Neutral Cleaner. The C/S pad was detached from auto scrubber, and both of this detached pad and the tank of auto scrubber were well cleaned with ample running water to make sure there was no residue left from previous test. One ounce of 3M™ concentrated Neutral Cleaner 3H was uniformly diluted with 3 gallons of water in a 5-gallon bucket, and then added to auto scrubber tank. The test was done with the same numbers of passes in section 220, with conditions as described above for Example-2.

The Cleaning Efficiency and Surface Restoring Results were Tabulated in Table 3 and Table 4

TABLE 3

Gloss and DOI of test sections.

| | Gloss profile: Existing surface | Gloss profile: 3H cleaner with C/S pad (10 pass) | Gloss profile: Example-2 with C/S pad (10 pass) | | DOI profile: Existing surface | DOI profile: 3H cleaner with C/S pad (10 pass) | DOI profile: Example-2 with C/S pad (10 pass) |
|---|---|---|---|---|---|---|---|
| Gloss | 17.9 | 25.04 | 39.6 | DOI | 3.48 | 8.1 | 12.06 |

TABLE 4

| Color change of test sections. | | |
|---|---|---|
| | Color profile | |
| | 3H cleaner with C/S pad (10 pass) | Example-2 with C/S pad (10 pass) |
| Delta E | 1.91 | 3.16 |

Test with Example 3 and Revive SC Plus Cleaner on Worn Floor Coating

Figure 3:
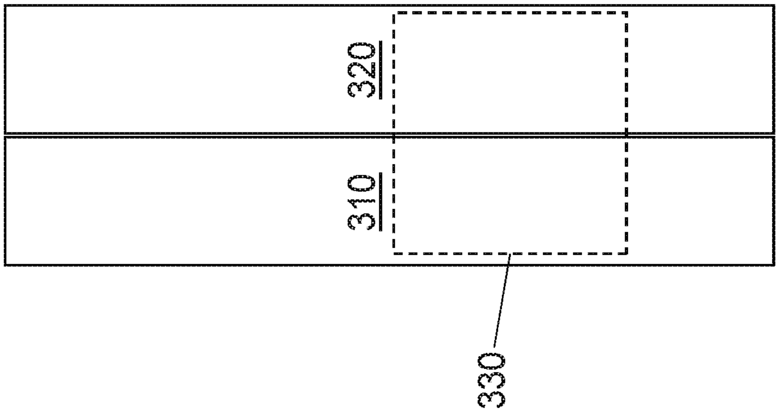
FIG. 3 is a schematic of a second on-floor test configuration.

Test was conducted on highly worn, Scotchgard™ Low Maintenance 18 (LM-18) Floor Finish coated semi white Vinyl Composite Title (VCT). The test was conducted with two of 2 ft×9 ft areas, sections 310 and 320, with this worn floor as shown in FIG. 3. The soiled section 330 was prepared as follows: an even layer of carpet soil was sprinkled over the test area and spread evenly using a dry microfiber pad.

Example-3 was prepared following the same procedures as for Example-2 according to Table 5.

TABLE 5

| Formula of Example-3. | |
|---|---|
| Materials | Example-3 |
| Water (g) | 129.0 |
| Ethyl carbitol (g) | 3.33 |
| Sodium Silicate (37.0 wt. %, g) | 9.0 |
| Potassium siliconate (20 wt. %, g) | 6.7 |
| Acrylic emulsion (35%, g) | 33.33 |
| TOMADOL 900 surfactant (g) | 14 |
| ECOSURF EH-6 surfactant (g) | 6 |
| EASY-WET 20 wetting agent (g) | 2 |

Procedure

Test with Example-3. The holding tank of T3 auto scrubber was well cleaned with water. One ounce of Example-3 was uniformly diluted with 6 gallons of water in two of a 5-gallon bucket, and then added to auto scrubber tank. A new Scotch-Brite™ Clean & Shine Pad (C/S Pad) was loaded to the auto scrubber. Auto scrubber were run 20 passes in section 320 with the following test conditions: medium setting of water flow, high pad pressure and lowest setting of walking speed.

Test with Revive SC Plus Cleaner. The C/S pad was detached from the auto scrubber, and both of the detached pad and the tank of auto scrubber were well cleaned with ample running water to make sure there was no residue left from previous test. One ounce of Revive SC Plus Cleaner was uniformly diluted with 2 gallons of water in a 5-gallon bucket, and then added to auto scrubber tank. The test was done in section 310 with the same numbers of passes and conditions as described above for Example-3.

The cleaning efficiency and surface restoring results were tabulated in Table 6 and Table 7.

TABLE 6

| Gloss and DOI of test sections. | | | | | | | |
|---|---|---|---|---|---|---|---|
| | Gloss profile | | | | DOI profile | | |
| | Existing surface | Revive SC with C/S pad (20 pass) | Example-3 with C/S pad (20 pass) | | Existing surface | Revive SC with C/S pad (20 pass) | Example-3 with C/S pad (20 pass) |
| Gloss | 23 | 34 | 41.5 | DOI | 3 | 9.9 | 12 |

TABLE 7

| Color change of test sections. | | |
|---|---|---|
| | Color profile | |
| | Revive SC with C/S pad (20 pass) | Example-3 with C/S pad (20 pass) |
| Delta E (worn section) | 0.62 | 2.35 |
| Delta E (soiled section) | 9.44 | 11.13 |

General Observations on Results

The Examples above show that the working formulations perform comparably if not better to other available floor cleaners on a variety of floor coatings. The formulations' versatility in a wide variety of circumstances may be beneficial to a facility having different coating and floor types. In addition, the working formulations outperform exemplary floor cleaners in terms of gloss and distinctness of image when its use over time is simulated with multiple passes.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A cleaning and polishing fluid, comprising:
water;
a wetting agent based on N-octyl-2-pyrrolidone;
a polymer; and
a silicate;
wherein the water is greater than 98 wt % of the fluid and wherein the cleaning and polishing fluid is suitable for use with a moving abrasive pad on hard floor surfaces to clean the hard floor surfaces wherein the hard floor surface comprises a coated stone floor, a coated vinyl floor, a coated tile vinyl composition tile floor, or a solid vinyl tile floor.

2. The cleaning and polishing fluid of claim 1, further comprising a siliconate.

3. The cleaning and polishing fluid of claim 1, wherein the polymer is an acrylic emulsion polymer.

4. The cleaning and polishing fluid of claim 1, further comprising a surfactant.

5. The cleaning and polishing fluid of claim 1, wherein a pH of the fluid is greater than 9.

6. A method of cleaning and increasing a gloss of a hard floor surface, comprising:
dispensing onto the hard floor surface an aqueous cleaning solution including greater than 98 wt % water, a polymer, a wetting agent based on N-octyl-2-pyrrolidone, and a silicate;
contacting the hard floor surface with a moving abrasive pad in the presence of the aqueous cleaning solution; and
drying the hard floor surface, wherein the hard floor surface comprises a coated stone floor, a coated vinyl floor, a coated tile vinyl composition tile floor, or a solid vinyl tile floor.

7. The method of claim 6, wherein a time between the dispensing and the drying is less than ten seconds.

8. The method of claim 6, wherein the step of drying includes suctioning liquid from the hard floor surface.

9. The method of claim 6, wherein the abrasive pad does not include a fine abrasive, wherein a fine abrasive includes particles between 0.1 and 30 micrometers.

10. The method of claim 6, wherein the abrasive pad includes a fine abrasive, wherein a fine abrasive includes particles between 0.1 and 30 micrometers.

11. The method of claim 6, wherein the hard floor surface is a coated stone floor.

12. The method of claim 6, wherein the hard floor surface is a coated vinyl floor.

13. The method of claim 6, wherein the hard floor surface is a coated vinyl composition tile floor.

14. The method of claim 6, wherein the hard floor surface is a solid vinyl tile floor.

15. The method of claim 6, further comprising repeating the steps of dispensing, contacting, and drying through multiple passes.

16. A method of cleaning and increasing a gloss of a hard floor surface, comprising:
contacting a hard floor surface with an abrasive pad in the presence of an aqueous cleaning solution including greater than 98 wt % water, a wetting agent based on N-octyl-2-pyrrolidone, a polymer, and a silicate, wherein the hard floor surface comprises a coated stone floor, a coated vinyl floor, a coated tile vinyl composition tile floor, or a solid vinyl tile floor.

17. A method of preparing a floor cleaning and polishing fluid comprising:
providing a cleaning solution concentrate including water, a wetting agent based on N-octyl-2-pyrrolidone, a polymer, and a silicate;
diluting the concentrate in water such that the water is greater than 98 wt % of the cleaning and polishing fluid, wherein the cleaning and polishing fluid is suitable for use with a moving abrasive pad on hard floor surfaces, wherein the hard floor surface comprises a coated stone floor, a coated vinyl floor, a coated tile vinyl composition tile floor, or a solid vinyl tile floor.

18. A method of maintaining a hard floor surface, comprising:
cleaning and polishing the hard floor surface at the same first time to increase an initial first gloss to a resulting first gloss; and
after an interval, cleaning and polishing the hard floor at the same second time to increase an initial second gloss to a resulting second gloss;
wherein the steps of cleaning and polishing the hard floor surface at the same first and second times include dispensing onto the hard floor surface an aqueous cleaning solution including greater than 98 wt % water, a wetting agent based on N-octyl-2-pyrrolidone, a polymer, and a silicate, contacting the hard floor surface with a rotating abrasive pad in the presence of the aqueous cleaning solution, drying the hard floor surface, and optionally repeating the steps of dispensing, contacting, and drying through multiple passes; and
wherein at the first time, at the second time, and during the interval, the hard floor surface is not subjected to burnishing, and
wherein the hard floor surface comprises a coated stone floor, a coated vinyl floor, a coated tile vinyl composition tile floor, or a solid vinyl tile floor.

19. The method of claim 18, wherein the interval is at least 24 hours.

20. The method of claim 18, wherein burnishing means being contacted by a pad rotating at 750 rpm or more in the absence of an effective amount of water.

* * * * *